(12) United States Patent
Shepard et al.

(10) Patent No.: US 8,863,028 B2
(45) Date of Patent: Oct. 14, 2014

(54) MOTION DESKTOP

(75) Inventors: John Shepard, Redmond, WA (US);
Felix Cheung, Redmond, WA (US);
Alex Aben-Athar Kipman, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1143 days.

(21) Appl. No.: 12/724,627

(22) Filed: Mar. 16, 2010

(65) Prior Publication Data

US 2010/0171748 A1 Jul. 8, 2010

Related U.S. Application Data

(63) Continuation of application No. 11/649,077, filed on Jan. 3, 2007, now Pat. No. 7,712,047.

(51) Int. Cl.
*G06F 13/00* (2006.01)
*G06F 15/00* (2006.01)
*G09G 5/36* (2006.01)
*G06F 3/14* (2006.01)

(52) U.S. Cl.
CPC . *G09G 5/363* (2013.01); *G06F 3/14* (2013.01)
USPC .......................................... 715/805; 715/788

(58) Field of Classification Search
CPC .................................. G06F 3/14; G09G 5/363
USPC ......... 715/804–805, 788–790, 799–803, 716, 715/771, 723, 783, 779
See application file for complete search history.

(56) References Cited

U.S. PATENT DOCUMENTS

| | | |
|---|---|---|
| 4,498,079 A | 2/1985 | Ghosh et al. |
| 4,580,165 A | 4/1986 | Patton et al. |

(Continued)

FOREIGN PATENT DOCUMENTS

| | | |
|---|---|---|
| CN | 101573728 | 11/2009 |
| JP | 2010515194 | 5/2010 |

(Continued)

OTHER PUBLICATIONS

Bizzocchi, Jim, "Video as Ambience: Reception and Aesthetics of Flat-Screen Video Display", http://crossings.tcd.ie/issues/4.1/Bizzocchi/.

(Continued)

*Primary Examiner* — Kevin Nguyen
(74) *Attorney, Agent, or Firm* — John Jardine; Andrew Sanders; Micky Minhas

(57) ABSTRACT

A motion desktop, including a moving image, may be presented on a display screen of a processing device. Foreground items such as, for example, icons and associated text, or other information, may appear on a surface of the motion desktop. In embodiments consistent with the subject matter of this disclosure, foreground content may be rendered to a composing surface, which may be an alpha-enabled surface capable of presenting translucent items. A motion desktop module may render content for at least a portion of a background of the motion desktop to a respective shared memory, shared with a composer. The composer may periodically copy the rendered content from the shared memory to the composing surface, where the composer may compose and blend a scene from background and foreground content. The composed scene may then be presented as the motion desktop.

20 Claims, 9 Drawing Sheets

(56) References Cited

U.S. PATENT DOCUMENTS

| | | | |
|---|---|---|---|
| 5,422,674 | A | 6/1995 | Hooper et al. |
| 5,523,791 | A | 6/1996 | Berman |
| 5,940,080 | A * | 8/1999 | Ruehle et al. ............. 345/611 |
| 6,020,891 | A | 2/2000 | Rekimoto |
| 6,064,393 | A | 5/2000 | Lengyel et al. |
| 6,229,542 | B1 | 5/2001 | Miller |
| 6,700,588 | B1 | 3/2004 | MacInnis et al. |
| 7,043,701 | B2 | 5/2006 | Gordon |
| 7,107,549 | B2 | 9/2006 | Deaton et al. |
| 2004/0073935 | A1 | 4/2004 | Kang |
| 2007/0064112 | A1 * | 3/2007 | Chatting et al. ......... 348/207.99 |
| 2008/0163060 | A1 | 7/2008 | Shepard et al. |

FOREIGN PATENT DOCUMENTS

| | | |
|---|---|---|
| KR | 1020010008134 A | 2/2001 |
| KR | 1020010016495 A | 3/2001 |
| KR | 1020050116260 A | 12/2005 |
| KR | 20090106498 | 10/2009 |
| KR | 1019990078635 A | 11/2009 |
| RU | 2009125411 | 1/2011 |
| WO | WO-2008085726 | 7/2008 |

OTHER PUBLICATIONS

McCrickard et al., "A model for notification systems evaluation—assessing user goals for multitasking activity", Date: Apr. 2003, pp. 1-27, vol. 5, http://people.cs.vt.edu/~mccricks/papers/MCSN02.pdf.

Stotts et al., "Facetop: An Integrated Desktop/Video Interface for Individual Users and Paired Collaborations", http://rockfish-cs.cs.unc.edu/pubs/stotts-uist-04.pdf.

PCT/US2007/088800; Written Opinion of the International Searching Authority, mailed Jun. 3, 2008 (corresponds to parent application).

"European Search Report", Mailed Date: Apr. 5, 2011, Application No. EP/07869884, 8 Pages.

Zheng, Long, "use a screensaver as your windows Vista", Retrieved at << http://microsoft.blognewschannel.com/index.php/archives/2006/10/11/use-a-screensaver-as-your-vista-desktop/ >>, Oct. 11, 2006, p. 1.

"Foreign Notice of Allowance", CN Application No. 200780049174.5, (Jan. 13, 2012), 4 pages.

"Foreign Notice of Allowance", EP Application No. 07869884.2, (Jan. 3, 2013), 7 pages.

"Foreign Notice of Allowance", JP Application No. 2009-544891, (Jul. 21, 2011), 4 pages.

"Foreign Notice of Allowance", KR Application No. 10-2009-7013841, (May 9, 2013), 6 pages.

"Foreign Notice of Allowance", RU Application No. 2009125411, (Apr. 10, 2012), 24 pages.

"Foreign Office Action", CN Application No. 200780049174.5, (Apr. 14, 2011), 12 pages.

"Foreign Office Action", CN Application No. 200780049174.5, (Oct. 19, 2011), 6 pages.

"Foreign Office Action", EP Application No. 07869884.2, (Apr. 26, 2011), 1 page.

"Foreign Office Action", EP Application No. 07869884.2, (May 11, 2012), 5 pages.

"Foreign Office Action", Korean Application No. 10-2009-7013841, (Jan. 31, 2013), 4 pages.

"Foreign Office Action", RU Application No. 2009125411, (Nov. 23, 2011), 7 pages.

"International Search Report", Application No. PCT/US2007/088800, (Jun. 3, 2008), 2 pages.

"Non-Final Office Action", U.S. Appl. No. 11/649,077, (Apr. 30, 2009), 8 pages.

"Notice of Allowance", U.S. Appl. No. 11/649,077, (Dec. 22, 2009), 12 pages.

* cited by examiner

MOTION DESKTOP

This application is a continuation application of U.S. patent application Ser. No. 11/649,077 filed in the U.S. Patent and Trademark Office on Jan. 3, 2007 now U.S. Pat. No. 7,712,047.

BACKGROUND

Today, users may select custom static images to use as desktop wallpaper on their processing devices. Graphics processing power of modern processing devices make it possible to offer substantially richer content as a desktop background. For example, a moving image may be provided as a desktop background for a processing device.

Previously, various applications have attempted to create acceptable motion desktops using a video overlay feature. When using the video overlay feature, a background area of a desktop may be assigned a particular chromatic key value. Video may be generated to a clipping region defined by the area having the particular chromatic key value. A clipping region is an area in which graphics or video may be presented. However, an approach using the video overlay feature has two problems. First, features such as shadow text and partially translucent elements are fundamentally incompatible with a background generated by using the video overlay feature. For example, a shadow portion of shadow text and areas behind translucent elements may have a color associated with an approximation of the particular chromatic key value. The areas having the approximation of the particular key chromatic key value may appear to be out of place with any video that may overlay areas having the particular chromatic key value. Second, because systems typically have only one video overlay resource, by capturing this resource and using it on the desktop, other applications such as, for example, media players or video editing applications, may be unable to acquire and use the video overlay resource.

In another approach to creating acceptable motion desktops, arbitrary content on the desktop may be drawn by creating complex clipping regions, which exclude desktop items, such as icons and associated text, as well as other items. The motion desktops performed poorly using this approach. The desktop items were not composed with a background and each time the background was updated, the updated background needed to be "cut out" using a clipping region. This resulted in a poor user experience. Further, this approach is complex for requiring that the clipping region be maintained as the desktop is updated and this approach does not consider how to treat translucent elements.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a motion desktop may be presented on a display screen of a processing device. The motion desktop may include a moving image as a background and foreground items such as, for example, icons and associated text, or other information, as a foreground. Foreground content may be rendered onto a composing surface, which in some embodiments may be an alpha-enabled surface capable of presenting translucent items. One or more motion desktop modules may render content to respective shared memories for respective portions of a moving image background of the motion desktop. A composer may use the rendered content from the respective shared memories to compose a scene on the composing surface from the foreground content and the rendered content with respect to the moving image, and may blend portions of the composed scene. The composed scene may then be presented on a display screen of a processing device as the motion desktop.

In embodiments consistent with the subject matter of this disclosure, a moving image of a background of the motion desktop may be rendered and composed on the composing surface for presentation upon receiving a notification from a motion desktop module indicating that rendered background content is available for composing the motion desktop. In some embodiments, the moving image of the background of the motion desktop may be rendered and composed on the composing surface periodically, such that the moving image of the background of the presented motion desktop may be degraded, in order to provide a high quality of service for presenting foreground items of the motion desktop and other applications.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

A processing device may present a motion desktop, which may include a moving image on a display screen of the processing device with foreground items such as, for example, icons and associated text, or other information, appearing on a surface of the moving image. One way to conceptualize a motion desktop experience is to think of a surface of the motion desktop, with which a user may interact, as a piece of glass hanging in front of a three dimensional scene in which a number of interesting things may be viewed. The scene may be as simple as a video projected onto an orthogonal rectangle scaled to fill an entire display screen (video wallpaper), or may be as rich as rendering a camera view of a persistent three dimensional multiplayer game world.

In embodiments consistent with the subject matter of this disclosure, foreground content may be an interact-able portion of a desktop, which may be driven by user data. The foreground content may be redirected such that it may be rendered to a composing surface, such as, for example, an alpha-enabled surface capable of presenting translucent items. One or more motion desktop modules may render content for at least a portion of a background of the motion desktop to a respective shared memory, shared with a composer. Periodically, the composer may use the rendered content from each respective shared memory to compose a scene and may blend background and foreground portions of the scene. As a result, high-quality visual effects may be achieved and presented. In some embodiments, an alpha blending operation may be offloaded to a graphics processing unit (GPU) found in modern graphics cards, thereby providing a high fidelity visual experience without significantly impacting available processing capacity for other applications and services.

Exemplary Processing Device

Figure 1:
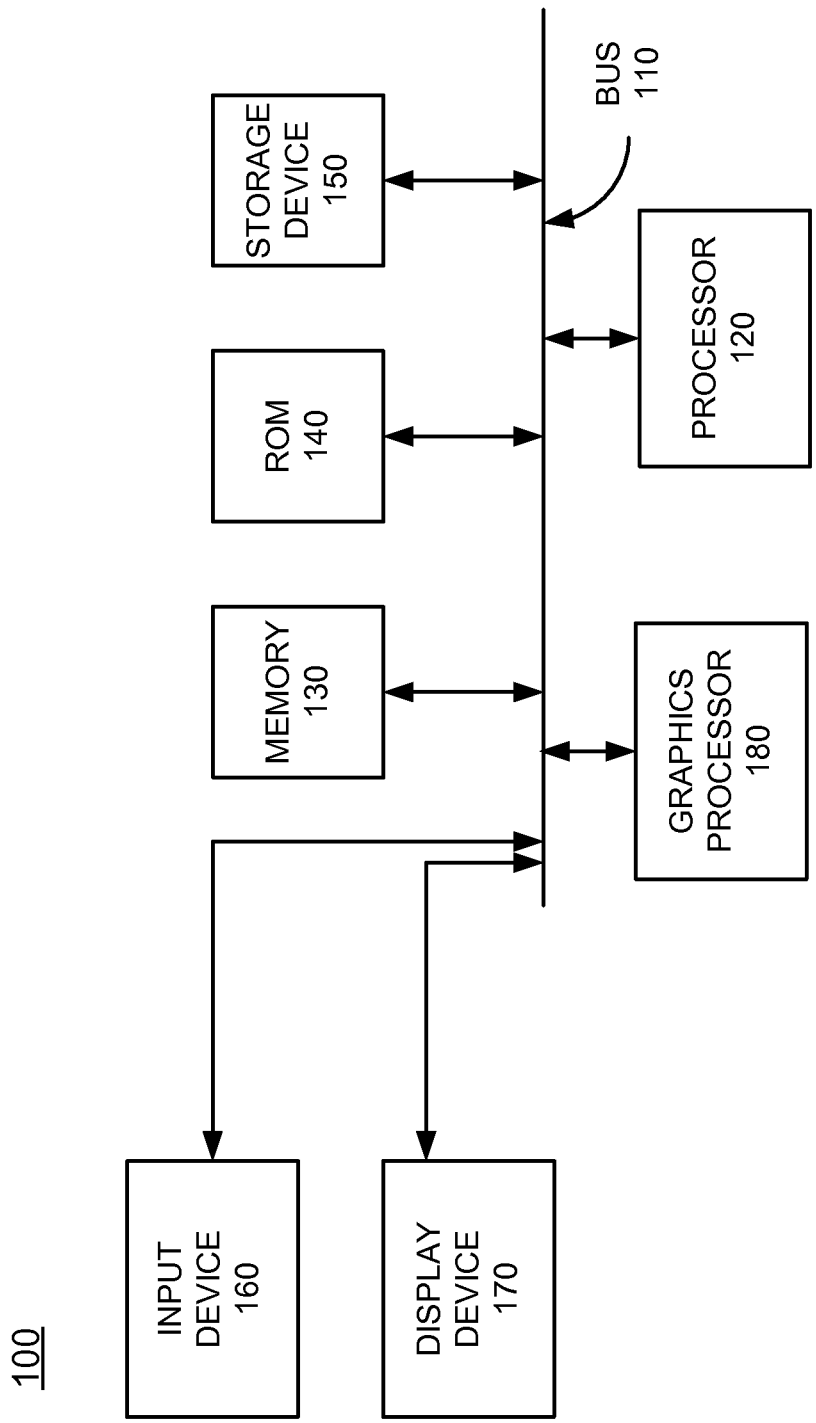
FIG. 1 is a functional block diagram of a processing device which may implement embodiments consistent with the subject matter of this disclosure.

FIG. 1 is a functional block diagram of a processing device 100 which may be used to implement embodiments consistent with the subject matter of this disclosure. Processing device 100 may include a bus 110, a processor 120, a memory 130, a read only memory (ROM) 140, a storage device 150, an input device 160, a display device 170 and a graphics processor 180.

Bus 110 may be a communication interface that permits communication among components of processing device 100. Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of tangible media for storing data and/or instructions. Graphics processor 180 may include at least one graphics processor for processing data and presenting a graphics image.

Processing device 100 may perform such functions in response to processor 120 executing sequences of instructions contained in a machine-readable medium, such as, for example, memory 130, or other tangible media. Such instructions may be read into memory 130 from another tangible machine-readable medium, such as storage device 150, or from a separate device via communication interface 180.

Exemplary Operation

Figure 2:
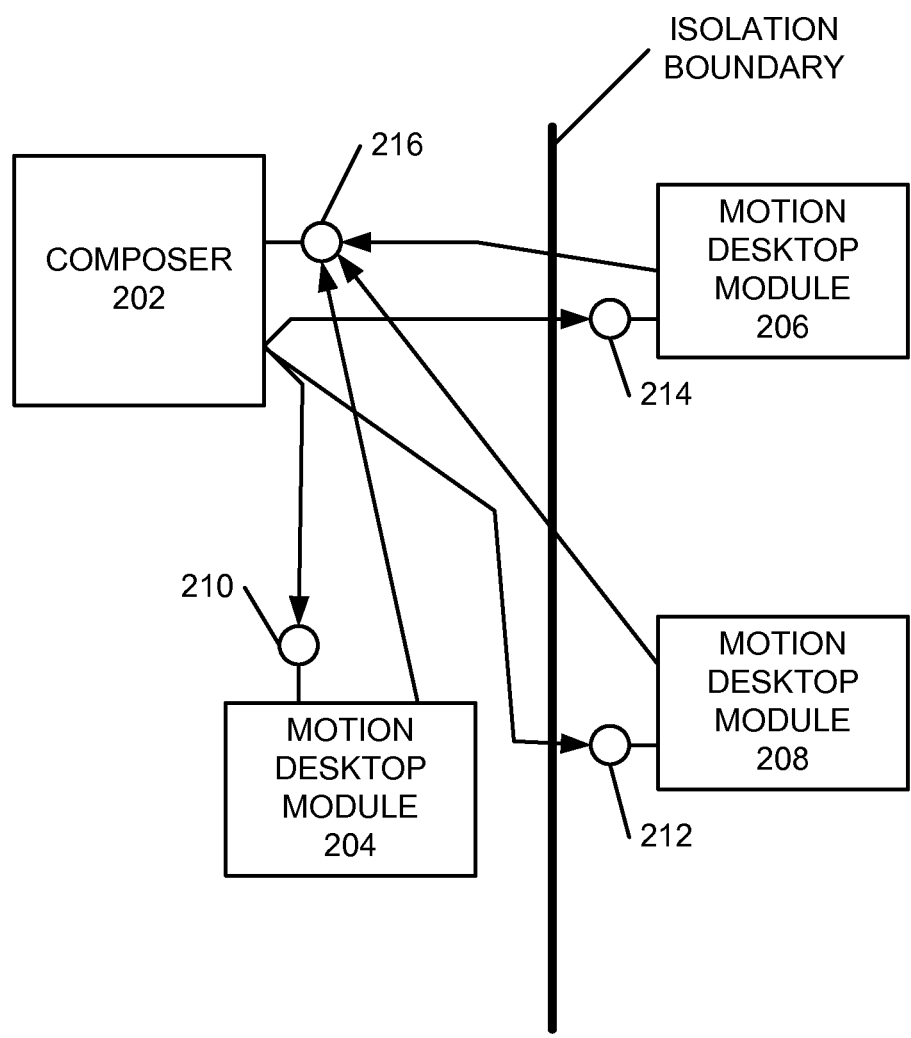
FIG. 2 is a functional block diagram illustrating exemplary components of an embodiment consistent with the subject matter this disclosure.

FIG. 2 is an exemplary functional block diagram illustrating components and interfaces in an embodiment consistent with the subject matter of this disclosure. The embodiment of FIG. 2 may include a composer 202 and motion desktop modules 204, 206 and 208. Composer 202 may interface with motion desktop modules 204, 206 and 208 via application program interfaces (APIs) 210, 212 and 214, respectively. Each of motion desktop modules 204, 206 and 208 may interface with composer 202 via API 216.

Each of motion desktop modules 204, 206 and 208 may render content of at least a portion of a background for a motion desktop to a respective shared memory, which may be shared with composer 202. The rendered content may be a moving image. Composer 202 may be responsible for using the rendered content from respective shared memories to compose a scene on a composing surface, which may be an alpha-enabled surface. Further, foreground content such as, for example, icons and associated text, as well as other items, may be redirected to the composing surface. Composer 202 may blend foreground content with the rendered content from the respective shared memories to compose the scene, which may be presented on a display screen of a processing device such as, for example, display device 170. In some embodiments, the composing surface may be processed and alpha blended by a graphics processor or graphics processing unit (GPU).

In the embodiment shown in FIG. 2, composer 202 and motion desktop module 204 may execute in a single process, while motion desktop modules 206, 208 may execute in a process separate from the process in which composer 202 and module desktop module 204 may execute. In some embodiments, a composer and motion desktop modules may execute in a single process. In other embodiments, a composer and motion desktop modules may each execute in separate processes. In some of the embodiments, the composer may be isolated from one or more of the motion desktop modules.

Figure 3:
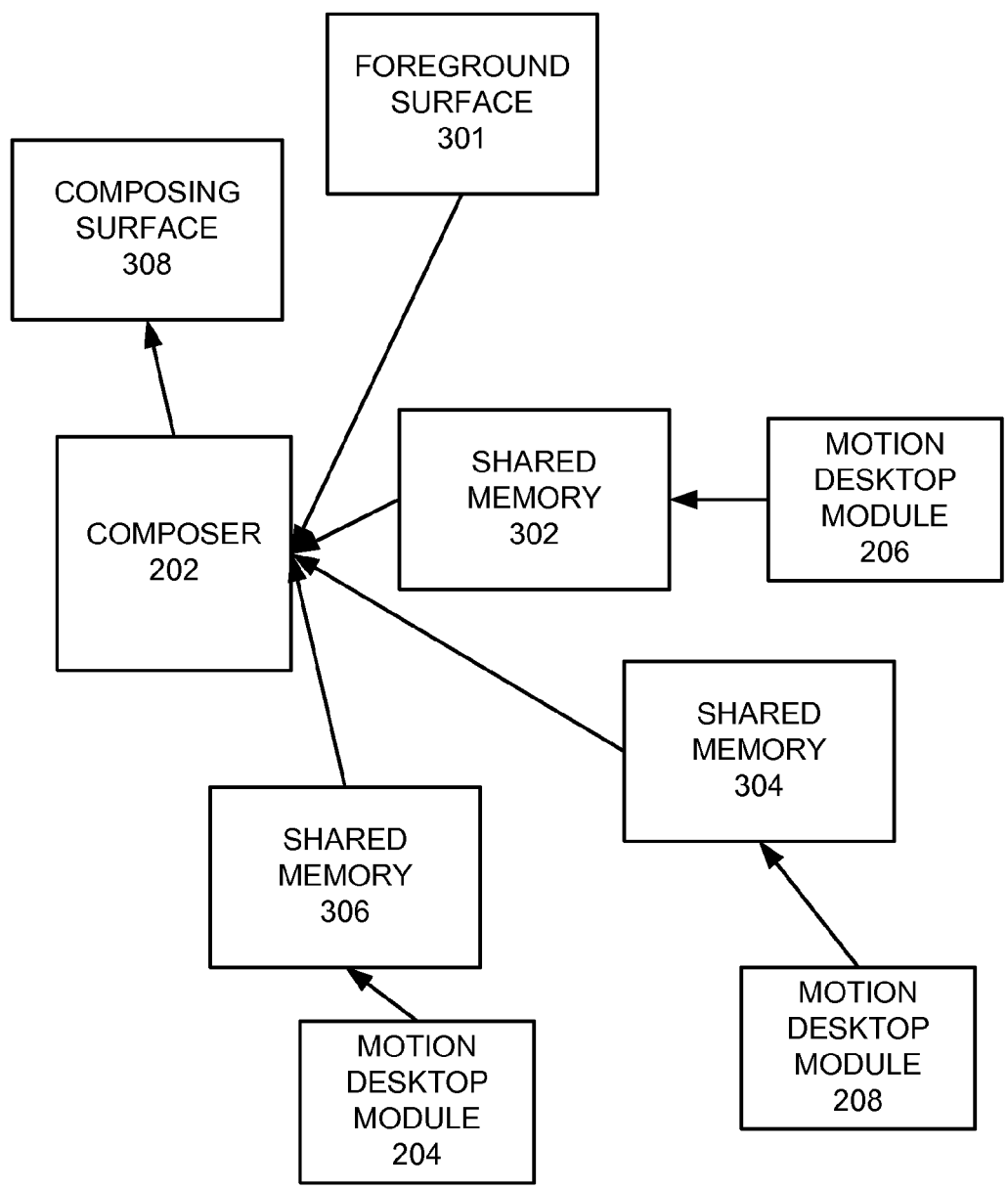
FIG. 3 is a functional block diagram illustrating exemplary components and communication among the exemplary components via respective shared memories in an embodiment consistent with the subject matter of this disclosure.

FIG. 3 is a functional block diagram further illustrating aspects of an embodiment consistent with the subject matter of this disclosure. In this embodiment, motion desktop module 204 may render content for at least a portion of a background of a motion desktop to a shared memory 306, motion desktop module 206 may render content for at least a second portion of the background of the motion desktop to a shared memory 302, and motion desktop module 208 may render content for at least a third portion of the background of motion desktop to a shared memory 304. Each of motion desktop modules 204, 206, 208 may inform composer 202 of where and how content from each respective motion desktop module should be positioned within a background screen. For example, centered content from a motion desktop module may take up a postage stamp sized portion of the screen, or the centered content may be stretched to completely cover a visible region of the screen or beyond. Composer 202 may assume that motion desktop modules 204, 206, 208 know a best way to present their respective content and composer 202 may honor each respective motion desktop modules position request, if possible. In a situation in which a motion desktop module requests that it's respective content be positioned such that the content overlaps with content from another motion desktop module, composer 202 may simply honor a most recent motion desktop module request (i.e. last request wins).

In this embodiment, each of shared memories 302, 304 and 306 may be shared with composer 202. In one embodiment, each of motion desktop modules 204-206 may notify composer 202 when respective rendered content is available for composer 202. Upon receiving a notification from a respective motion desktop module, composer 202 may use the content within shared memories 302, 304 or 306 to compose the background surface. Background and foreground content from foreground surface 301 may then be composed as a scene on a composing surface 308, which may be an alpha-enabled surface, and blended for presentation as the newly updated motion desktop.

The embodiment illustrated in FIG. 3 is an exemplary embodiment. In other embodiments, fewer or more motion desktop modules may be included. For example, one embodiment may include only one motion desktop module and one shared memory.

Exemplary Processing

Figure 4:
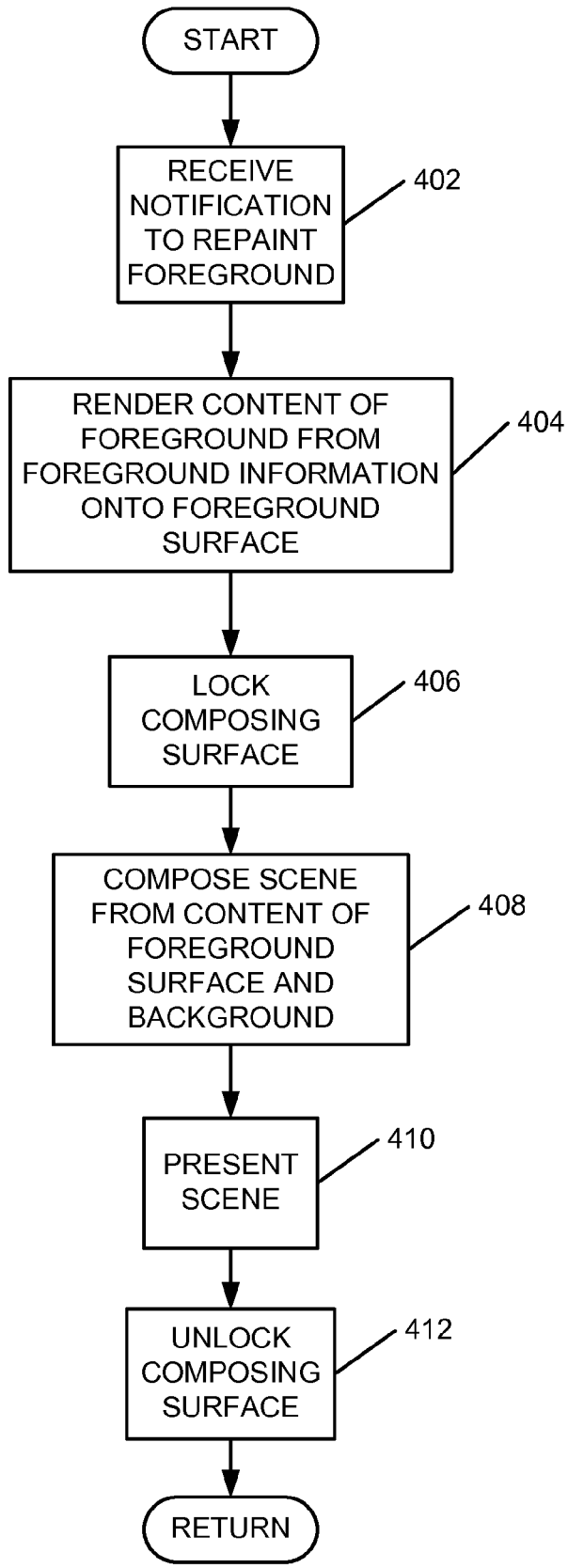
FIG. 4 is a flowchart illustrating an exemplary process for rendering foreground content of a motion desktop.

FIG. 4 illustrates an exemplary process which may be performed in embodiments consistent with the subject matter of this disclosure. The exemplary process of FIG. 4 illustrates processing that may occur when a composer such as, for example, composer 202 receives a notification to repaint foreground content of a foreground of a motion desktop.

The process may begin with composer 202 receiving a notification to repaint the foreground content of the foreground of the motion desktop (act 402). The foreground content may be rendered onto foreground surface 301 from foreground information that describes things such as, icons, associated text, or other items (act 404). In some embodiments, composer 202 may issue a communication to an operating system component, or other system component, requesting that the foreground content be rendered to foreground surface 301.

Next, in order to prevent other composer 202 threads from writing to composing surface 308, composer 202 may lock composing surface 308 (act 406). Locking may performed via a hardware or software mechanism. Composer 202 may then compose and blend a scene from the rendered foreground content of foreground surface 301 and rendered background content, which may have been previously copied to the composing area (as will be explained below), or from the rendered background content included in one or more shared memories (act 408). In some embodiments, composer 202 may offload blending of the scene to a GPU. Composer 202 may then present the scene on a display of a processing device as the motion desktop (act 410). Composer 202 may then unlock composing surface 308 to permit the other composer 202 threads to write to composing surface 308 (act 412).

Figure 5:
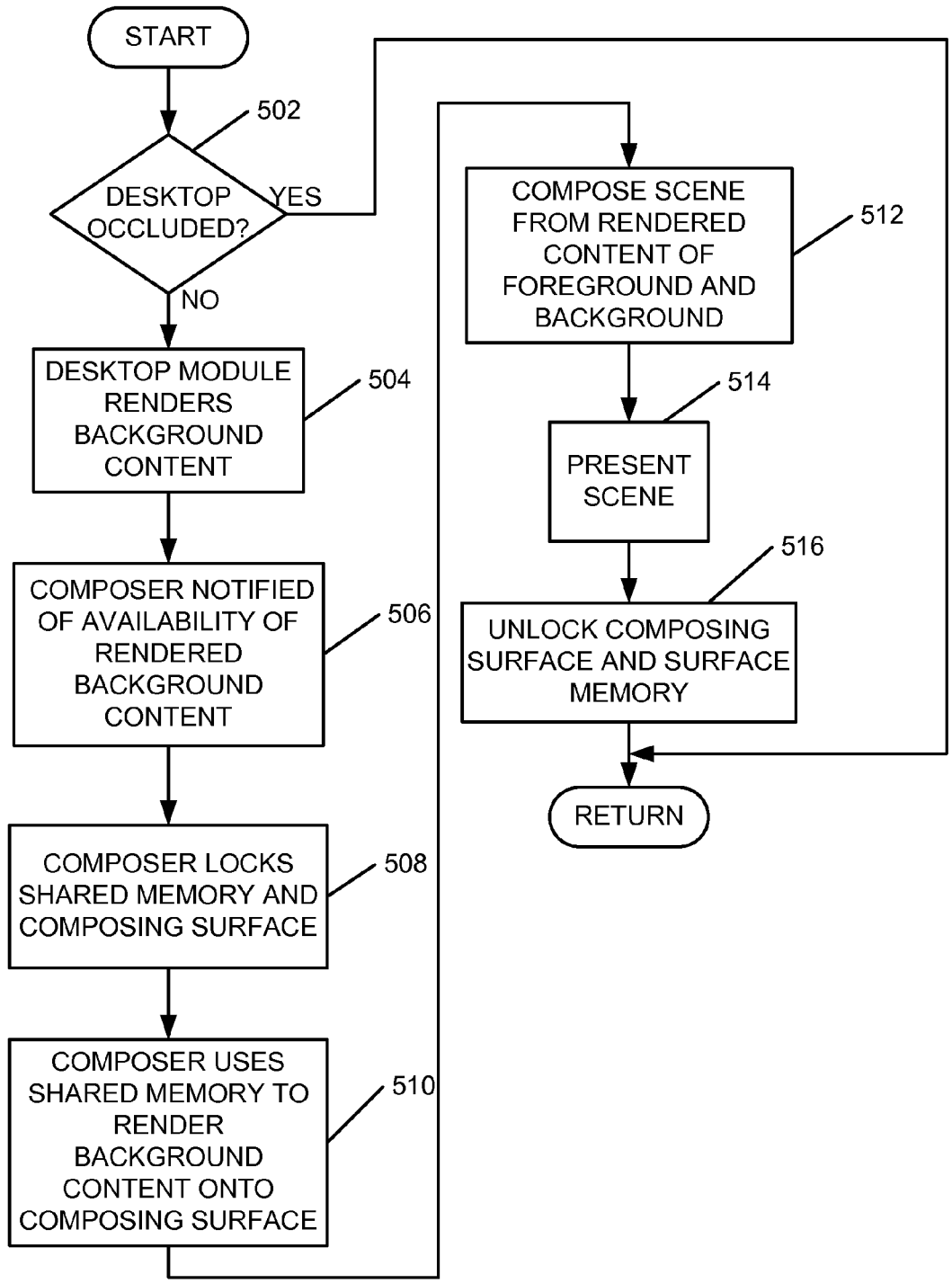
FIG. 5 is a flowchart illustrating an exemplary process for rendering background content, composing a scene from the rendered background content and rendered foreground content, and presenting the scene as the motion desktop.

FIG. 5 is a flowchart of an exemplary process which may be implemented in embodiments consistent with the subject matter of this disclosure to update background content of a motion desktop. The exemplary process may be performed by a composer, such as composer 202, and a motion desktop module executing in a same process or separate processes.

The process may begin with a motion desktop module determining whether the motion desktop is occluded (act 502). The motion desktop may be occluded by a window or other item being displayed which blocks the motion desktop from being displayed. The motion desktop also may be occluded under other conditions, which may include, but not be limited to, when the desktop is in a suspended state, when a session is locked, or when a screen saver is executing. If the motion desktop module determines that the motion desktop is occluded, then the process may return. That is, the rendering of the content of a moving image onto composing surface 308, which may be an alpha-enabled surface, may be halted or suspended when the motion desktop module determines that the motion desktop is occluded. In other words, the rendering of the content of a moving image onto composing surface 308 may be performed only when the motion desktop is not occluded.

If the motion desktop module determines that the motion desktop is not occluded, then the motion desktop module may render content such as, for example, moving image content for a background of the motion desktop, onto a shared memory (act 504). The motion desktop module may then notify a composer such as, for example, composer 202, of availability of the rendered content of the motion desktop module for the background (act 506). Composer 202 may then lock the shared memory to prevent the motion desktop module from writing to the shared memory and may lock composing surface 308 to prevent foreground content from being written to composing surface 308 (act 508).

Composer 202 may then use contents of the shared memory to render background content onto composing surface 308 (act 510) and may compose and blend a scene based on rendered foreground content, previously rendered to composing surface 308, and the rendered content for the background, newly rendered to composing surface 308 (act 512). The composed scene may then be presented on a display of a processing device as the motion desktop (act 514). In some embodiments, blending of the scene may be offloaded to a GPU. Composer 202 may then unlock composing surface 308 and the shared memory to again allow foreground content to be rendered to composing surface 308 from foreground surface 301 and to allow the motion desktop to write to the shared memory (act 516). The process may again be executed at a later time when the motion desktop module may again render background content to update the background of the motion desktop.

In some embodiments, a motion desktop module may share multiple memories with composer 202. In such an embodiment, when the motion desktop module notifies the composer that background content is available in one of the shared memories, the motion desktop module may then use an other of the shared memories. Composer 202 may then use the one of the shared memories to render background content to composing surface 308 while the motion desktop module may render updated background content to the other of the shared memories. In such embodiments, the motion desktop module may continue to render background content while any one of the shared memories may be locked.

Figure 6:
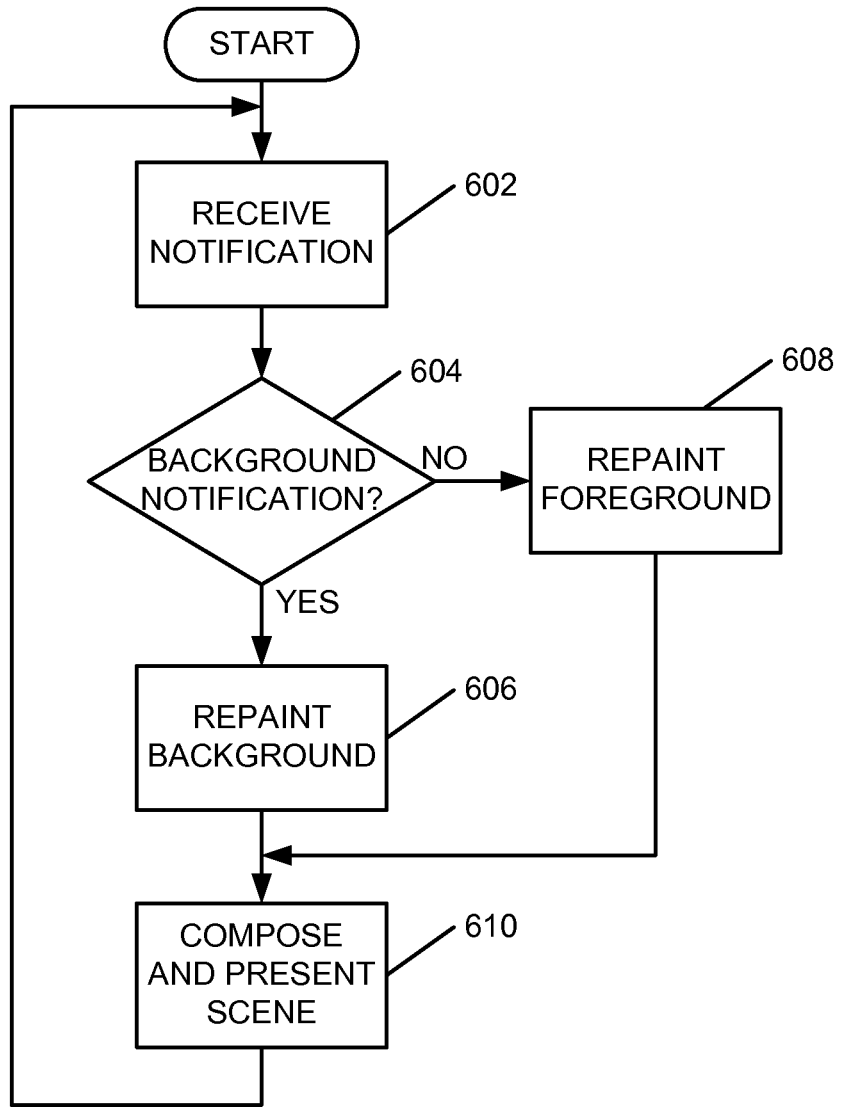
FIG. 6 is a flowchart illustrating an exemplary process for receiving notifications and repainting a foreground portion or a background portion of a motion desktop.

In some embodiments, a composer such as, for example, composer 202 may receive, from a same or different sources, a foreground update notification or a background update notification, which may cause a foreground or a background, respectively, of a motion desktop to be updated and presented. FIG. 6 is a flowchart of an exemplary process that may be implemented in such embodiments.

The process may begin with composer 202 receiving a notification (act 602). Composer 202 may determine whether the notification is a background notification, indicating that a motion desktop module rendered background content to a shared memory (see act 504; FIG. 5), or whether the notification is a foreground notification, indicating that a foreground of the motion desktop may be updated (act 604). If composer 202 determines that the received notification is a background notification from a motion desktop module, then composer 202 may repaint the background of the motion desktop (act 606) by using content of a respective shared memory to render the content to composing surface 308, as previously described with respect to acts 506-516 of FIG. 5. In some embodiments, composing surface 308 may be an alpha-enabled surface. Composer 202 may then compose and blend a scene from the newly rendered content of composing surface 308 and foreground content, which may have been previously rendered to composing surface 308 from foreground surface 301 (act 610). Acts 602-610 may then be repeated.

If, at act 604, composer 202 determines that the notification is a foreground notification, then composer 202 may repaint the foreground of the motion desktop (act 608) by composing a scene based on content of the foreground rendered onto composing surface 308 from foreground surface 301 and content of the background of the motion desktop rendered onto composing surface 308, as previously described with respect to acts 404-412.

Figure 7A:
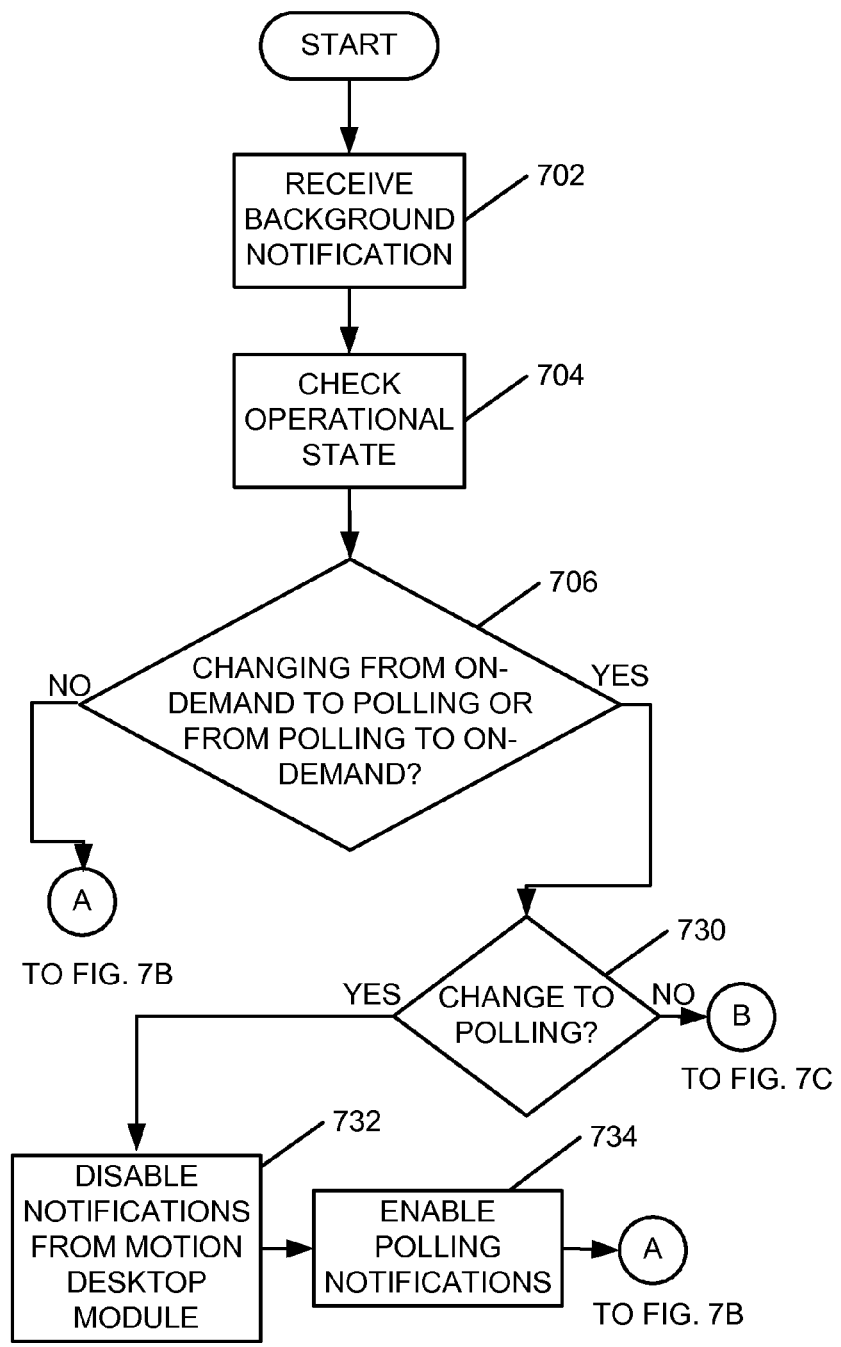
FIGS. 7A-7C are flowcharts illustrating an exemplary process for rendering, composing, and presenting the motion desktop, and for changing an updating method for updating the motion desktop.
Figure 7B:
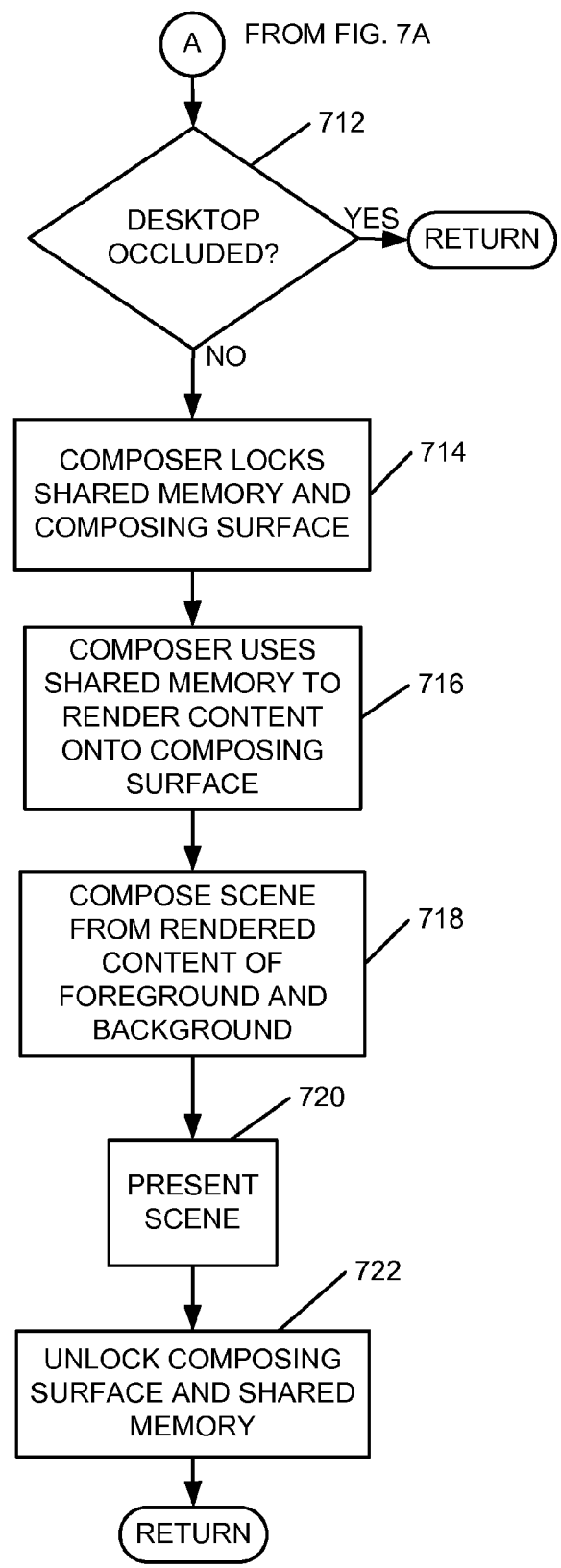
Figure 7C:
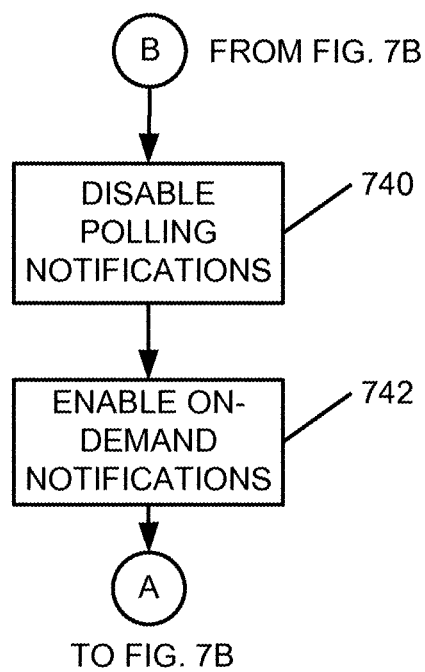

In other embodiments consistent with the subject matter of this disclosure, a presentation quality of a background of a motion desktop may be scaled, or degraded, based, at least in part, on a state of a processing device presenting the motion desktop. That is, a frequency for rendering background content based on a moving image may be adjusted based, at least in part, on the state of the processing device presenting the motion desktop. For example, if the motion desktop is determined to be in a battery-powered state, a low-powered state, or in a remote desktop state (indicating that the motion desktop of the processing device is being displayed on a remote processing device), then the background of the motion desktop may be updated less often. If the state of the processing device changes, for example, from a battery-powered state, or a low-powered state to a plugged-in state, then the presentation quality of the background of the motion desktop may again be presented at a higher quality. FIGS. 7A-7C are flowcharts illustrating an exemplary process that may be implemented in such embodiments.

The process may begin with composer 202 receiving a notification to update a background of a motion desktop (act 702). Composer 202 may check an operational state of a processing device upon which composer 202 is executing (act 704). For example, composer 202 may determine whether the processing device is in a battery-powered state, a low-powered state, a remote desktop state, or in another state. In this embodiment, a presentation quality of the background of the motion desktop may be scaled or degraded when the operational state of the processing device is in a low-powered state or in a remote-desktop state. In other embodiments, the presentation quality of the background of the motion desktop may be scaled or degraded when the operational state of the processing device is in a low-powered state, a battery-powered state, or a remote-desktop state. In yet other embodiments, the presentation quality of the background of the motion desktop may be scaled or degraded when the operational state of the processing device is in other states. The presentation quality of the background of the motion desktop may be degraded by changing an updating operation of the background of the motion desktop such that one or more motion desktop modules may be polled periodically for updates (hereinafter referred to as "polling" updating), instead of updating the background of the motion desktop upon receiving a notification from a respective motion desktop module (hereinafter referred to as "on-demand" updating).

After checking the operational state, composer 202 may determine, based on the operational state, whether a change in updating from "polling" to "on-demand" or from "on-demand" to "polling" is to occur (act 706). If composer 202 determines that no change in the updating operation is to occur, then composer 202 may determine whether the motion desktop is occluded (act 712; FIG. 7B). If composer 202 determines that the motion desktop is occluded, then no further processing may occur until a next background notification is received. That is, if the motion desktop is occluded, then the background of the motion desktop may not be updated.

If composer 202 determines that the motion desktop is not occluded, then composer 202 may lock a shared memory, shared with a motion desktop module, to prevent the motion desktop module from writing to the shared memory, and composer 202 may lock composing surface 308 to prevent other composer 202 threads from writing to composing surface 308 (act 714). Composer 202 may then use the shared memory to render content of the shared memory onto composing surface 308 (act 716). Composer 202 may then compose a scene from the rendered background and foreground content on composing surface 308 and may blend the background content and the foreground content (act 718). In some embodiments, blending may be performed by a GPU. The composed scene may then be presented by composer 202 on a display of processing device as the motion desktop (act 720). Composer 202 may then unlock composing surface 308 to permit the other composer 202 threads to write to composing surface 308 and composer 202 may unlock the shared memory to allow the motion desktop module to write to the shared memory (act 722). Upon receiving another notification, act 702 may again be performed.

If, at act 706 (FIG. 7A), composer 202 determines that a change in the updating of the motion desktop is to occur, then composer 202 may determine whether the change in the updating is a change to "polling" updating (act 730). If composer 202 determines that the change is to "polling" updating, then composer 202 may then may disable or ignore notifications from the motion desktop module indicating availability of updated rendered background content in the shared memory (act 732). Composer 202 may then enable polling notifications (act 734). That is, notifications received to indicate that an update to the background of the motion desktop is to occur, may be generated periodically based on a predetermined time period, such as 10 times per second, or another time period. Such notifications may be generated upon expiration of a timer, which may be restarted upon expiration while executing during "polling" update operation. Acts 712-722 (FIG. 7B) may then be performed by composer 202 to compose, render and present the motion desktop.

If, at act 730, composer 202 determines that updating is not to be changed to "polling" updating, then composer 202 may assume that updating is to be changed to "on-demand" updating. Composer 202 may then disable polling notifications by, for example, stopping a timer, or performing another action (act 740; FIG. 7C) and may enable "on-demand" notifications (act 742) such that, for example, notifications from the motion desktop module, indicating that an updated background content is available in the shared memory, may again cause the background of the motion desktop be updated. Composer 202 may then perform acts 712-722 (FIG. 7B) to update the background of the motion desktop. When another notification is received, such as, for example, a notification from the motion desktop indicating availability of updated rendered content in the shared memory, composer 202 may again perform act 702 (FIG. 7A).

The process illustrated by the flowcharts of FIGS. 7A-7C is exemplary. In other embodiments, the acts may be performed in a different order, or different or other acts may be performed. In a variation of the embodiment illustrated by FIGS. 7A-7C, instead of checking an operational state of a processing device (act 704), composer 202 may determine whether a foreground of a motion desktop has a particular quality of service. That is, composer 202 may determine whether the background is being updated too frequently, thereby causing a degradation in quality in the presented foreground of the motion desktop. For example, in one embodiment, composer 202 may determine whether multiple notifications were received, indicating that the foreground of the motion desktop may be updated, at a time when composer 202 was unable to update the foreground of the presented motion desktop. In such a situation, composer 202 may cause a change from "on-demand" updating to "polling" updating in order to guarantee that the foreground of the motion desktop has the particular quality of service. Composer 202 may later cause a change from "polling" updating back to "on-demand" updating if a predetermined time period has passed, such as, for example, 15 minutes or another predetermined time period. In some embodiments, if, after switching back to "on-demand" updating, multiple notifications, with respect to updating the foreground of the motion desktop are received, within a second predetermined time period, and composer 202 again was unable to update the foreground of the motion desktop, then composer 202 again may cause a change from "on-demand" updating to "polling" updating for a longer time period than the predetermined time period.

In a variation of the exemplary method described with reference to FIGS. 7A-7C, instead of changing to "polling" updating, composer 202 may inform the motion desktop module to enter a "controlled" mode, in which composer 202 may command the motion desktop module to pause, stop or go. In such an embodiment, the motion desktop module may release resources when in a "paused" or "stopped" state. For example, acts 732-734 may be modified such that the controller may notify the motion desktop module to enter the "controlled" mode and may command the motion desktop module to enter a "paused state". Acts 740-742 may be modified such that the controller may notify the motion desktop module to exit the "controlled" mode and enter the "on-demand" updating mode.

Although the above-referenced flowcharts illustrate only a single motion desktop module executing on a processing device, in other embodiments, multiple motion desktop modules may be executing on the processing device. In such embodiments, each of the motion desktop modules may render content to a respective shared memory, shared with composer 202, in which a portion of content of a background of the motion desktop may be rendered.

Further, in some embodiments consistent with the subject matter of this disclosure sound may be included when presenting the motion desktop. In such embodiments, composer 202 may expose a master audio volume control for audio sessions that may have been started by a motion desktop module.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

The invention claimed is:

1. A method for rendering a motion desktop that has a background and a foreground, the method comprising:
rendering content based on a moving image onto a shared memory;
rendering foreground content of the foreground to a composing surface capable of presenting translucent items; and
composing a scene including the rendered content from the shared memory as at least a portion of the background and the rendered foreground content of the foreground, the foreground composed on top of the background, and the composing comprising blending the rendered content of the moving image and the rendered foreground content.

2. The method of claim 1, wherein said rendering the content based on the moving image onto the shared memory and said composing the scene are performed in separate processes.

3. The method of claim 1, further comprising:
rendering the content based on a second moving image onto a second shared memory, wherein:
the composing of the scene further comprises composing the scene including the rendered content from the second shared memory as at least another portion of the background.

4. The method of claim 1, further comprising:
degrading a presentation quality of the background of the motion desktop based, at least in part, on a determined state of the processing device.

5. The method of claim 1, further comprising:
determining whether the motion desktop is occluded, and wherein:
the rendering of the content onto the shared memory based on the moving image is performed when the motion desktop is not occluded.

6. The method of claim 1, further comprising:
presenting the scene as the motion desktop;
determining a state of the processing device; and
selectively adjusting a rate at which the content based on the moving image is rendered based, at least in part, on the determined state of the processing device.

7. The method of claim 6, wherein said selectively adjusting the rate at which the content based on the moving image is rendered further comprises:
performing the rendering of the content, based on the moving image, in a controlled mode.

8. The method of claim 1, wherein:
the composing surface capable of presenting translucent items is an alpha-enabled composing surface; and
the blending of the rendered content of the moving image is alpha blending.

9. A computer-readable memory comprising stored instructions configured for execution by at least one processor of a processing device that performs operations comprising:
rendering background content of at least a portion of a background of a motion desktop onto a shared memory;

rendering foreground content of a foreground of the motion desktop to an alpha-enabled composing surface capable of presenting translucent items;

composing a scene based on the rendered foreground content and the rendered background content from the shared memory;

presenting the scene on a display as the motion desktop;

determining a state of the processing device; and selectively adjusting a rate at which the background content is rendered based, at least in part, on the determined state of the processing device.

10. The computer-readable memory of claim 9, wherein the processing device performs said selectively adjusting the rate at which the background content is rendered is performed in a controlled mode.

11. The computer-readable memory of claim 9, wherein the processing device performs:

said rendering the foreground content of the motion desktop includes rendering the foreground content on an on-demand basis; and said rendering the background content of the motion desktop includes rendering the background content on a polling basis.

12. The computer-readable memory of claim 9, wherein the processing device performs said selectively adjusting the rate when the processing device is in a remote desktop state, a battery operated state, or a low power state.

13. The computer-readable memory of claim 9, wherein the processing device further performs operations comprising:

rendering the background content of at least a second portion of the background of the motion desktop onto a second shared memory based on a second moving image; and said composing the scene further comprises composing the scene based on the rendered background content of the at least second portion of the background of the motion desktop from the second shared memory.

14. The computer-readable memory of claim 9, wherein the processing device further performs operations comprising:

determining whether the motion desktop is occluded; and halting the rendering of the background content of the motion desktop when the motion desktop is determined to be occluded.

15. A processing device comprising:

at least one processor and a memory to implement instructions to render a motion desktop, the instructions configured to:

render background content of at least a portion of a moving background of the motion desktop onto a shared memory; render foreground content of a foreground of the motion desktop executed in a separate process from the instructions to render the background content;

compose a scene based on the rendered foreground content and the rendered background content from the shared memory, the scene composed by alpha blending at least a portion of the rendered background content of the moving background and at least a portion of the rendered foreground content of the foreground;

present the composed scene as the motion desktop;

determine a state of the processing device; and selectively adjust a rate at which the background content of the moving background is rendered based, at least in part, on the determined state of the processing device.

16. The processing device of claim 15, wherein the instructions to selectively adjust the rate at which the background content of the moving background is rendered further comprise instructions to decrease the rate when the processing device operates in a state of battery operation, low-power operation, or remote desktop operation.

17. The processing device of claim 15, wherein the instructions to selectively adjust the rate at which the background content of the moving background is rendered further comprise instructions to adjust the rate in a controlled mode.

18. The processing device of claim 15, wherein the instructions are configured to:

render the background content of at least a second portion of the moving background of the motion desktop onto a second shared memory; and wherein the instructions further compose the scene based on the rendered background content of the at least second portion of the moving background from the second shared memory.

19. The processing device of claim 15, wherein the instructions are configured to include sound when the composed scene is presented as the motion desktop.

20. A method, implemented on a processing device, for rendering a motion desktop for the processing device, the motion desktop having a background and a foreground, the method comprising:

rendering content based on a moving image onto a shared memory;

rendering content of the foreground to an alpha-enabled composing surface capable of presenting translucent items;

composing a scene including the rendered content from the shared memory as at least a portion of the background and the rendered content of the foreground, the foreground being placed on top of the background, and the composing further comprising alpha blending at least a portion of the rendered content of the moving image and at least a portion of the rendered content of the foreground;

presenting the scene as the motion desktop;

determining a state of the processing device; and selectively adjusting a rate at which the content based on the moving image is rendered based, at least in part, on the determined state of the processing device, wherein the method is performed by the processing device.

* * * * *